United States Patent [19]

Chouinard

[11] Patent Number: 4,889,365

[45] Date of Patent: Dec. 26, 1989

[54] COUNTERFEIT RESISTANT LABEL AND METHOD OF MAKING THE SAME

[75] Inventor: Gerald A. Chouinard, Elburn, Ill.

[73] Assignee: The Label Printers, Aurora, Ill.

[21] Appl. No.: 179,885

[22] Filed: Apr. 11, 1988

[51] Int. Cl.[4] ........................ B42D 15/00; G09F 3/00; B32B 3/22; G06K 19/06

[52] U.S. Cl. ........................................ 283/70; 283/88; 283/92; 235/491

[58] Field of Search ........................ 283/70, 72, 81, 85, 283/88, 89, 91, 92, 93, 94; 235/491; 40/625

[56] References Cited

U.S. PATENT DOCUMENTS

| | | | |
|---|---|---|---|
| 2,262,492 | 11/1941 | Farrell | 283/92 |
| 3,614,430 | 10/1971 | Berler | 235/491 |
| 3,640,009 | 2/1972 | Komiyama | 283/89 |
| 3,671,720 | 6/1972 | White et al. | 235/491 |
| 4,157,784 | 6/1979 | Grottrup et al. | 283/88 |
| 4,627,642 | 12/1986 | Peronneau | 283/92 |
| 4,627,819 | 12/1986 | Burrows | 283/88 |
| 4,729,128 | 3/1988 | Grimes | 283/94 |

FOREIGN PATENT DOCUMENTS

| | | | |
|---|---|---|---|
| 1213193 | 11/1970 | United Kingdom | 283/88 |

*Primary Examiner*—Frank T. Yost
*Assistant Examiner*—Paul M. Heyrana, Sr.
*Attorney, Agent, or Firm*—Wood, Dalton, Phillips Mason & Rowe

[57] ABSTRACT

A counterfeit resistant label for goods is manufactured by selecting a code word from a plurality of possible code words to identify a particular label and desired information relative to the goods with which the label is to be associated, applying the code word as a series of marks in several but less than all of a plurality of predetermined locations on the face of the label using an ink that is sensitive to light in the nonvisible spectrum, and masking the visibility of the ink in light in the visible spectrum over substantially all of the predetermined locations.

12 Claims, 2 Drawing Sheets

FIG. 1
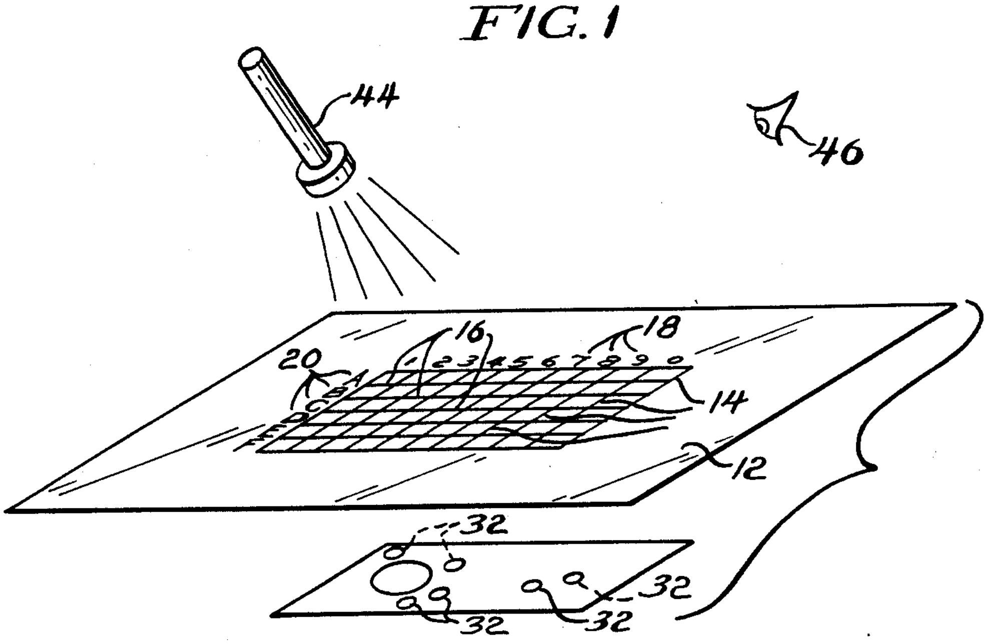
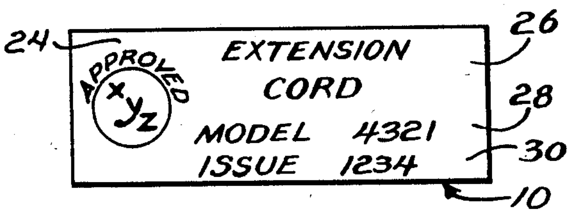
FIG. 2
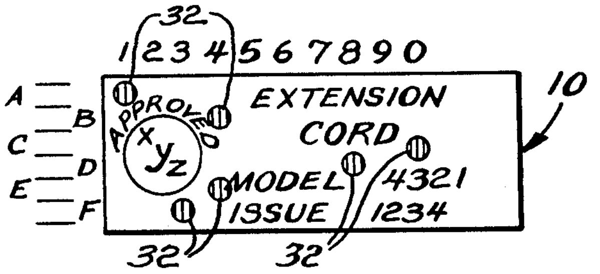
FIG. 3
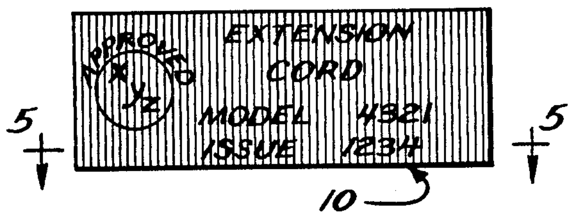
FIG. 4

COUNTERFEIT RESISTANT LABEL AND METHOD OF MAKING THE SAME

FIELD OF THE INVENTION

This invention relates to labels, and more particularly, to labels utilized on products to designate that they have been approved by some particular body or trade group.

BACKGROUND OF THE INVENTION

Products of various manufacturers are often provided with labels designating that the product has the seal of approval of some organization or trade group as a selling tool indicating quality of the product. In such cases, the designated body or trade group approving of the product will have in fact reviewed and/or tested the product to determine its acceptability and may include provision for continual monitoring of the quality of the product as a condition for maintenance of its approval.

In any event, it is conventional that such body or trade group charge the manufacturer a royalty or service charge for each unit bearing the approved label as one means of obtaining compensation for its services and/or endorsement of the product. Not infrequently, unscrupulous manufacturers will attempt to circumvent the per unit service charge or royalty requirement by printing up counterfeit labels for their product, in lieu of or in addition to legitimate labels. For example, the body or trade group to receive the royalty may be aware that one million labels have been printed and is paid a royalty on the basis of one million units. However, if the unscrupulous manufacturer has had an additional one million, counterfeit labels printed and applied to products, it will be apparent that the body or trade organization will not be receiving the royalty to which it is entitled for the second million units sold.

To try and minimize the problem, the approving body or trade groups frequently employ inspectors that may check, for example, the manufacturer's inventory of a particular product. All too often, it is difficult to make a meaningful check of inventory because a particular label on the product being inspected cannot be readily correlated with the information utilized by the body or trade organization for determining the royalty due it. Such information may, for example, include so-called "issue numbers", label quantities, label order dates, the identity of the vendor of the labels, identity of client, year of manufacture, etc. or the like.

The present invention therefore, seeks to provide a label that is resistant to counterfeiting and which may be read by qualified personnel in such a way as to provide such personnel with ready access to pertinent information that they may require in the proper performance of their duties.

SUMMARY OF THE INVENTION

It is the principal object of the invention to provide a new and improved label system for impeding counterfeiting. It is also an object of the invention to provide a method of manufacturing such a label.

According to one facet of the invention, the label system includes a substrate defining a label base having one side for attachment to a product or packaging therefor and a product identification side. Visible indicia are disposed on the product identification side for providing product identification to a viewer of the product identification side and additional indicia of a first color is printed on the product identification side with an ink that will be visible when illuminated with light of a frequency outside of the visible spectrum. The additional indicia are in the form of several discrete marks at less than all of a plurality of predetermined locations on the opposite side to define a selected code word from a family of code words, each code word designating at least one different bit of information. Mask means are provided on the product identification side for masking the presence of the discrete marks except when illuminated with the light of a frequency outside the visible spectrum.

According to a preferred embodiment, the predetermined locations are in the form of a grid and in a highly preferred embodiment, the grid is a rectilinear grid.

According to one embodiment of the invention, the masking means is an ink of the same visible color as the additional indicia. According to this aspect of the invention, the ink used as the masking means may be a transparent ink placed on the substrate product identification side over both the visible indicia and the additional indicia.

The invention also contemplates the provision of a transparent overlay for selective placement on and removal from the product identification side of the label, the overlay including further indicia for identifying ones of the predetermined locations receiving the marks thereby identifying the selected code word.

The invention also contemplates a method of making a counterfeit resistant label which includes the steps of (a) selecting a code word from a plurality of possible code words to identify a particular label and desired information relative to the goods with which the label is to be associated, (b) applying the code word as a series of marks in several but less than all of a plurality of predetermined locations on the face of the label using an ink that is sensitive to light in the nonvisible spectrum, and (c) masking the visibility of the ink in light in the visible spectrum over substantially all of the predetermined locations.

According to a preferred embodiment of the method, step (c) is achieved by utilizing a label substrate whose face is the same color as the ink when viewed in light in the visible spectrum. Preferably, the label substrate color is obtained by printing another ink on the face of the label, such ink being insensitive to light in the nonvisible spectrum and being the same color as the ink marks when viewed in the light of the visible spectrum.

Other objects and advantages will become apparent from the following specification taken in connection with the accompanying drawings.

DESCRIPTION OF THE DRAWINGS

FIG. 1 is a perspective view of a label made according to the invention together with a transparent overlay utilized to identify a code word hidden on the label, a source of light in the nonvisible spectrum and the eye of a viewer of the label when illuminated by light from the source;

FIG. 2 illustrates the label at an initial step in its manufacture;

FIG. 3 illustrates the label in a subsequent step in its manufacture;

FIG. 4 illustrates the label following a final step in its manufacture;

DESCRIPTION OF THE PREFERRED EMBODIMENTS

Figure 5:
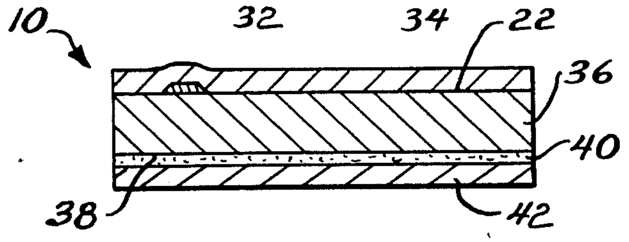
FIG. 5 is a sectional view of the label taken approximately along the line 5—5 in FIG. 4.

A first exemplary embodiment of a label system made according to the invention along with components employed during its use is illustrated in FIG. 1. As seen therein, a label made according to the invention is generally designated 10. Also employed with the invention is a transparent overlay 12 which may include a plurality of vertical lines 14 which intersect horizontal line 16 to define a grid. In the embodiment illustrated, the grid is 6×10 to provide a plurality of 60 predetermined locations. Vertical columns defined by the lines 14 are given designations of 1–0, inclusive, while horizontal columns are labeled A–F inclusive. The former designations are shown by numerical indicia 18 while the latter are shown by alphabetical indicia 20. The overall size of the rectilinear grid thus defined corresponds, in a preferred embodiment, to that of the label 10 although those skilled in the art will recognize that (a) the grid could be less than the size of the label 10, (b) the grid could be other than rectilinear, and (c) a greater or lesser number of predetermined locations could be used.

The upper surface 22 of the label 10, as best seen in FIGS. 2–4 inclusive, may include indicia 24 indicating the approval of some particular body or trade group, here the XYZ trade group, along with additional indicia 26 identifying the product with which the label 10 is to be used. In this regard, the label 10 may be attached either to the product itself or to packaging for the product as is appropriate. Further indicia 28 may include a model number of the like and still additional indicia 30 may include an issue number.

The face of the label 22 is also printed with a code word that is selected from a plurality of code words as representing one or more desired bits of information pertaining to the label and to the product to be associated therewith. The printing is accomplished through the use of discrete marks 32 (FIG. 3) of an ink that is sensitive to light in the nonvisible spectrum. Conventional ultraviolet light sensitive ink is generally employed for the purpose. The ink used will preferably be a transparent ink so that the indicia 24, 26, 28 and 30 will be visible therethrough.

As illustrated in FIG. 3, the marks 32 are in the form of dots but other types of marks as, for example, bars could be used as an alternative.

In the illustrated embodiment, the code word selected for imprintation on the label and represented by the marks 32, assuming an alphabet sequence of ABCDEF, is the number 140843. If an alphabet sequence of ADBECF were utilized, the code word on the label illustrated in FIG. 3 would be 184403. That is to say, the read sequence of the indicia 18 and/or 20 may be scrambled as desired for purposes to be seen.

The label 10 is also provided with a mask which is intended to prevent the marks 32 from being visible in light in the visible spectrum. FIG. 4 illustrates the label after application of the mask. Most typically, the mask will be formed by the application of a layer of transparent ink whose color is the same as that of the marks 32 when viewed in light in the visible spectrum. This layer of ink is shown at 34 in somewhat exaggerated form in FIG. 5. This ink is transparent so as to allow the marks 32 to appear therethrough as well as to allow the indica 24, 26, 28 and 30 to be read therethrough.

This layer of ink 34 will, of course be applied to the face 22 of the substrate 36 which defines the base of the label. Typically, the substrate 36 will be paper but other materials may be used in lieu thereof.

The side of the substrate 36 opposite the face 22 is designated 38 and may be provided with a layer of pressure sensitive adhesive 40 which in turn is protected by a removable release liner 42 of conventional construction.

In some cases, rather than print the masking means as an ink layer 34 over the indicia 24, 26, 28 and 30 and the marks 32, the face 22 could be preprinted with the marking ink layer 34 prior to the application of the the marks 32, or even the indicia 24, 26, 28 and 30. Alternatively, the masking means could comprise the base color of the stock 36 rather than a separate ink layer 34 or the like.

Figure 6:
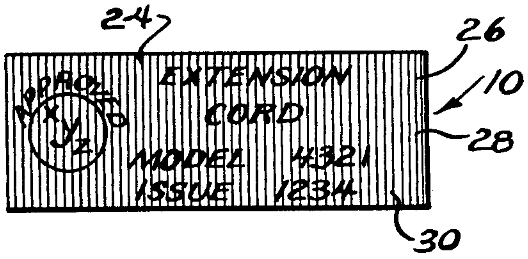
FIG. 6 illustrates a modified, and highly preferred, embodiment of a label at an early step in its manufacture.
Figure 7:
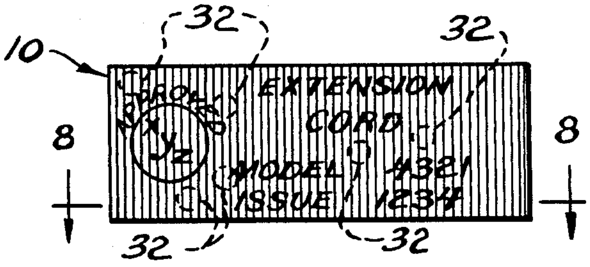
FIG. 7 illustrates the label of FIG. 6 following a final step of its manufacture.
Figure 8:
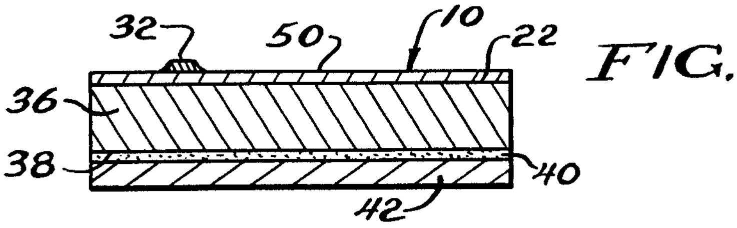
FIG. 8 is a sectional view taken approximately along the line 8—8 in FIG. 7.

The first of these alternatives constitute the best mode of the invention contemplated by the inventor and therefore is the highly preferred embodiment. It is illustrated in FIGS. 6, 7 and 8.

In the interest of brevity, components of the label that are common to all embodiments will not be redescribed but will be given the same reference numerals. In the embodiment shown in FIGS. 6, 7 and 8, the face 22 of the substrate 36 defining the label 10 is first printed with the indicia 24, 26, 28 and 30 as seen in FIG. 6. It is then coated or printed with a layer of transparent ink 50 as seen in FIG. 8.

After the application of the ink 50, the marks 32 are then printed on the ink layer 50. The marks 32 will, of course, be formed of a transparent ink that is sensitive to light in a nonvisable spectrum such as conventional ultraviolet light sensitive ink and will be of the same color as the ink 50. Consequently, the marks 32 will not be visible in the finished label and are therefore shown only in phantom in FIG. 7. In other words, the phantom showing of the marks 32 in FIG. 7 is only to show their position and not to indicate their visibility.

As can be appreciated from FIG. 1, once the label 10 is illuminated by a source of light 44 to which the ink forming the marks 32 is sensitive, those marks 32 become visible to the naked eye shown schematically at 46. By aligning the overlay 12 with the label 10, the location of the marks 32, and thus the code word represented thereby, can be ascertained. An inspector, having ascertained the code word, can simply refer to reference information that he/she may carry with him/her in the field to ascertain the information that the code word represents and thereby determine whether, for example, the quantity of labeled product in inventory is greater than that approved. Furthermore, if no code word appears when the label is inspected with the light source 44, the inspector will immediately know that a counterfeit label is being employed.

Thus, the invention provides two separate means of determining the legitimacy of labels. For even were a counterfeiter to go through all the effort to exactly duplicate a label 10 in the form shown in FIG. 4 which would include the hidden marks 32, the ability of the inspector to rapidly correlate the code with production information will enable the inspector to reveal instances of labeling in excess of those authorized or paid for by the authorizing body.

Finally, as noted earlier, the read sequence indicia 18 or 20 may be scrambled and the scramble order provided only to authorized personnel under good security. The order of scrambling could be changed at periodic intervals and will provide increased security against counterfeiting.

From the foregoing, it will be appreciated that a label system made according to the invention provides a high degree of protection against counterfeiting with only a minimum of cost. The cost of the labels is increased only slightly, it being estimated that only a 10–12% increase in cost will be required in the typical case.

I claim:

1. A label system for impeding counterfeiting comprising:

a substrate defining a label base having one side for attachment to a product or packaging therefore and an opposite product identification side;

visible indicia on said product identification side for providing product identification to a viewer of said product identification side;

additional indicia of a first color printed on said product identification side with an ink that will be visible when illuminated with light of a frequency outside of the visible spectrum, said additional indicia being in the form of several discrete marks at less than all of a plurality of predetermined locations on said opposite side to define a selected code word from a family of code words, each code word designating at least one different bit of information;

a mask means on said product identification side masking the presence of said discrete marks except when illuminated with said light of a frequency outside the visible spectrum.

2. The label system of claim 1 wherein said locations are in the form of a grid.

3. The label system of claim 2 wherein said grid is a rectilinear grid.

4. The label system of claim 1 wherein said masking means is an ink of the same visible color as said additional indicia.

5. The label system of claim 4 where said masking means ink is a transparent ink placed on said substrate product identification side over both said visible indicia and said additional indicia.

6. The label system of claim 1 and further including a transparent overlay for selective placement on and removal from said product identification side, said overlay including further indicia for identifying the ones of said predetermined locations receiving said marks and thus said selected code word.

7. A method of making a counterfeit resistant label comprising tee steps of:

(a) selecting a code word from a plurality of possible code words to identify a particular label and desired information relative to the goods with which the label is to be associated;

(b) applying the code word as a series of marks in several but less than all of a plurality of predetermined locations on the face of the label using an ink that is sensitive to light in the nonvisible spectrum; and (c) masking the visibility of the ink in light in the visible spectrum over substantially all of said predetermined locations.

8. The method of claim 7 wherein step (c) is achieved by utilizing a label substrate whose face is the same color as the ink when viewed in light in the visible spectrum.

9. The method of claim 7 wherein step (c) is performed by printing another ink on the face of said label, said another ink being nonsensitive to light in the nonvisible spectrum and the same color as said ink marks when viewed in light in the visible spectrum.

10. The method of claim 9 wherein said another ink is transparent and is placed on said face after the performance of step (b).

11. The method of claim 7 wherein each code word reprssents a unique combination of differing locations on a grid.

12. The method of claim 7 wherein step (c) is performed before the performance of step (b).

* * * * *